United States Patent
Girgis

(10) Patent No.: US 6,379,794 B1
(45) Date of Patent: Apr. 30, 2002

(54) ACRYLIC IMPREGNANT FOR FIBERS

(75) Inventor: Mikhail M. Girgis, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 08/980,262

(22) Filed: Nov. 28, 1997

Related U.S. Application Data

(60) Division of application No. 08/473,599, filed on Jun. 7, 1995, now abandoned, and a continuation-in-part of application No. 07/900,034, filed on Jun. 17, 1992.

(51) Int. Cl.$^7$ ............................................. D02G 3/00
(52) U.S. Cl. .................................... 428/375; 428/392
(58) Field of Search ................................. 428/375, 378, 428/391, 392, 394, 395; 427/163, 162, 165, 164, 204, 384, 386, 387

(56) References Cited

U.S. PATENT DOCUMENTS

| | | | |
|---|---|---|---|
| 3,175,988 A | 3/1965 | Berns | 260/29.6 |
| 3,599,418 A | 8/1971 | Hill | 57/164 |
| 3,617,353 A | 11/1971 | Cooney | 117/76 T |
| 3,853,605 A | 12/1974 | Fahey | 117/126 GB |
| 3,862,074 A | 1/1975 | Hickey | 260/29.6 NR |
| 4,009,317 A | 2/1977 | Chase et al. | 428/378 |
| 4,029,623 A | 6/1977 | Maaghul | 260/29.6 RW |
| 4,038,243 A | 7/1977 | Maaghul | 260/40 R |
| 4,049,865 A | 9/1977 | Maaghul | 428/391 |
| 4,060,658 A | 11/1977 | Lin et al. | 428/378 |
| 4,066,591 A | 1/1978 | Scriven et al. | 260/29.2 TN |
| 4,107,120 A | 8/1978 | Plamondon et al. | 260/29.6 RB |
| 4,137,209 A | 1/1979 | Wong et al. | 260/29.6 NR |
| 4,143,091 A | 3/1979 | Chang et al. | 260/859 R |
| 4,147,555 A | 4/1979 | Cohen et al. | 106/99 |
| 4,164,485 A | 8/1979 | Girgis | 260/5 |
| 4,181,769 A | 1/1980 | Plamondon et al. | 428/253 |
| 4,188,421 A | 2/1980 | Matsuura et al. | 427/385 A |
| 4,208,494 A | 6/1980 | Chang et al. | 525/440 |
| 4,208,495 A | 6/1980 | Chang et al. | 525/440 |
| 4,239,800 A | 12/1980 | Girgis | 428/374 |
| 4,263,362 A | 4/1981 | Straka | 428/258 |
| 4,291,095 A | 9/1981 | Chase, et al. | 428/391 |
| 4,316,929 A | 2/1982 | McIntire et al. | 428/262 |
| 4,374,177 A | 2/1983 | Hsu et al. | 428/392 |
| 4,382,991 A | 5/1983 | Pollman | 428/391 |
| 4,454,285 A | 6/1984 | Bijen | 524/5 |
| 4,473,606 A | 9/1984 | Rademacher | 428/251 |
| 4,514,037 A | * 4/1985 | Bishop et al. | 350/96.23 |
| 4,522,465 A | * 6/1985 | Bishop et al. | 350/96.3 |
| 4,576,987 A | 3/1986 | Crockatt et al. | 524/487 |
| 4,657,804 A | 4/1987 | Mays et al. | 428/212 |
| 4,663,231 A | * 5/1987 | Girgis et al. | 428/378 |
| 4,707,076 A | * 11/1987 | Skutnik et al. | 350/96.34 |
| 4,728,573 A | 3/1988 | Temple | 428/378 |
| 4,762,750 A | * 8/1988 | Girgis et al. | 428/378 |
| 4,762,751 A | 8/1988 | Girgis et al. | 428/378 |
| 4,875,758 A | * 10/1989 | Masuda et al. | 350/96.3 |
| 4,877,306 A | * 10/1989 | Kar | 350/96.33 |
| 4,904,051 A | * 2/1990 | Boer et al. | 350/96.3 |
| 4,948,829 A | 8/1990 | Mitsuji et al. | 524/457 |
| 4,954,559 A | 9/1990 | Den Hartog et al. | 524/507 |
| 4,962,996 A | * 10/1990 | Cuellas et al. | 350/96.34 |
| 4,997,260 A | * 3/1991 | Honjo et al. | 350/96.34 |
| 5,058,987 A | * 10/1991 | Hosoya | 385/128 |
| 5,171,634 A | 12/1992 | Soszka et al. | 428/376 |
| 5,182,784 A | * 1/1993 | Hager et al. | 385/128 |
| 5,319,003 A | 6/1994 | Gomez et al. | 523/222 |
| 5,385,756 A | 1/1995 | Lofton | 427/389.9 |

FOREIGN PATENT DOCUMENTS

| | | |
|---|---|---|
| EP | 0 356 655 | 7/1990 |
| FR | 2340389 | 10/1977 |
| JP | 76043119 | 11/1976 |
| JP | 80029948 | 8/1980 |
| JP | 62236831 | 10/1987 |
| JP | 63265839 | 11/1988 |
| JP | 92028663 | 5/1992 |
| JP | 93004349 | 1/1993 |
| SU | 595351 | 3/1978 |
| WO | WO 94/15884 | 7/1994 |

OTHER PUBLICATIONS

Textile Chemicals Product Brochure entitled "Polymers, Resins and Monomers" for RHOPLEX® HA–8, HA–12, HA–16, from Rohm and Haas Company, Philadelphia, Pennsylvania.

The Manufacturing Technology of Continuous Glass Fibres by K. L. Loewenstein (1973) p. 29.

USSN. 07/934,133, filed Aug. 21, 1992 entitled "Polyurethane Coated Fibers".

USSN 07/979,506, Filed Nov. 20, 1992, entitled "Multifilament Reinforcing Article".

USSN 08/081,045, filed Jun. 22, 1993 entitled "Acrylic Impregant for Fibers".

"Building Better Nonwovens", Product Bulletin of Rohm and Haas Co. Specialty Industrial Polymers, 1994.

"Rhoplex Acrylic Emulsions for Bonding and Finishing Dry–Laid Nonwoven Fabrics", Technical Bulletin of Rohm and Haas Co.

"Rhoplex E–32", Product Bulletin of Rohm and Haas Co.

"Chemicals for the Textile Industry", Technical Bulletin of Rohm and Haas Co., Nov. 1977.

"Glass Reinforcements in Composite Telecommunication Cable", T. Hager, 50th Annual Conference, Composites Institute, The Society of Plastics Industry, Inc., Jan. 30–Feb. 1, 1995.

\* cited by examiner

*Primary Examiner*—Merrick Dixon
(74) *Attorney, Agent, or Firm*—Andrew C. Siminerio

(57) ABSTRACT

An aqueous coating and/or impregnating composition is provided for treating a plurality or bundle of fibers. The coating composition includes an acrylic, ethylene acrylic acid copolymer and water.

29 Claims, No Drawings

ACRYLIC IMPREGNANT FOR FIBERS

CROSS REFERENCE TO RELATED APPLICATIONS

This application is a division of U.S. patent application Ser. No. 08/473,599, filed Jun. 7, 1995, which is a division of pending U.S. patent application Ser. No. 08/081,045, filed Jun. 22, 1993, which is a continuation-in-part of U.S. patent application Ser. No. 07/900,034, filed Jun. 17, 1994, now abandoned.

The present invention is directed to chemically treated bundles of fibers such as strands and yarn, which have been coated, encapsulated or otherwise treated with a coating and/or impregnant composition in addition to the sizing or binder conventionally applied to the fibers as they are produced, as well as to the impregnant composition itself. Fibers so treated may be processed into numerous products such as polymeric products, braided reinforcing or woven fabrics, and reinforcement for cables of optical fibers.

Glass fibers are conventionally produced by flowing molten glass through the orifices in a glass fiber bushing. As the molten glass passes through the holes in the bushing, it is cooled and solidifies into very small diameter (on the order of microns) fibers which are treated with a sizing composition which protects and conditions them for further processing. This protective sizing coating may contain lubricants, silanes, emulsifiers, antioxidants, antistatic agents, biocides, starches, oils, film forming polymers and a number of other ingredients known in the art. The exact composition of the sizing is dependent on the ultimate use of the fibers.

One deficiency of glass fibers is their flex fatigue. An attempt to solve the problem of providing a glass fiber with sufficient flexibility to be used in woven and nonwoven fabrics is described in U.S. Pat. No. 4,762,751 to Girgis et al., dated Aug. 9, 1988. This patent teaches a secondary coating having elastomeric curable polyurethanes, crosslinking agents, softeners and water. The fibers treated with this composition do not possess the desired amount of stiffness for certain applications, however. In addition, since polyurethane is a relatively expensive ingredient, the use of these fibers is somewhat limited.

Another impregnant known in the industry is a resorcinol formaldehyde latex or RFL coating which is used in making fibers which are compatible with rubber goods. The use of RFL coatings gives rise to a number of environmental and health concerns which limits their use..

It is an object of the present invention to provide less expensive flexible glass fibers which have been coated with an impregnant composition which is compatible with a range of polymers and can be used in a number of applications in which relative stiffness is needed. Such applications can include brushes, belts, hoses, filter felt for the paper industry, carpet backing, and reinforcement for optical fibers.

SUMMARY OF THE INVENTION

The objects of the invention are accomplished by sized fibers having a coating of a moisture reduced residue of a chemical coating and/or impregnating composition, hereafter referred to as the impregnant composition. The components of the impregnant composition are water soluble, emulsifiable or dispersible and comprise, in addition to water, a curable acrylic latex, and either a second acrylic latex, a wax, or a mixture of both and optionally, a thermoplastic polyurethane latex. The amount of the first acrylic latex, dispersion or emulsion can range from about 2.5 up to about 55 weight percent, while the amount of the second acrylic latex that can be curable and/or wax can range from about 0.5 to about 10 weight percent. When present, the amount of the polyurethane can range from about 2 up to about 50 weight percent. The aforementioned amounts are based on the weight percent of the aqueous impregnant composition. With the presence of the polyurethane, the second acrylic latex, which can be different from the first latex, and/or the wax is present as a third component. The amount of water in the aqueous impregnant composition is an amount to provide the composition with between 1 and 60 percent solids before drying. When the aforementioned components are the only ones present, the balance of the impregnant composition can be water. Although the impregnant composition may also include a water soluble dye in an amount sufficient to impart a color to the residue on the fibers. Also plasticizers with appropriate emulsifiers, where necessary, and curing and/or crosslinking agents like those known in the art can be present.

The glass fibers are treated with a fiber protectant to reduce interfilament abrasion. This aqueous first chemical composition or sizing may include film forming polymer liquids, emulsions, dispersions, and latices; silane coupling agents; lubricants; antifoams; antistatic agents; emulsifiers; bactericides or any other ingredient(s) known in the art to be useful in sizing fibers, though preferably not starch, in addition to water. The sizing is present on the fibers in an amount between about 0.5 percent and 5 percent by weight after drying. The sized fibers may be gathered together into bundles and further treated with the impregnant composition of this invention.

The process of impregnation includes passing the bundles of fibers or strands through a bath or dip of the impregnant composition and may include exposing the fibers to elevated temperatures for a time sufficient to at least partially dry the composition. The fiber bundles having the moisture reduced residue of the aqueous impregnant composition typically have a dip pick-up (DPU) of between about 5 to about 30 weight percent.

A plurality of fibers with the impregnant composition thereon can have excellent hydrolytic stability, good adhesion to several polymers such as styrene-butadiene-rubber (SBR), polyvinyl chloride (PVC), polyurethanes and others and are flexible yet stiff enough to be used in the manufacture of various and sundry materials. These can include: brushes, filters, reinforcement for rubber and/or elastomeric articles like belts and hoses, reinforcement for fiber optic cables, and geotextile applications. Additionally the coated and impregnated plurality or bundle of fibers having the dried residue of the impregnating composition has good corrosion resistant properties.

DETAILED DESCRIPTION OF THE INVENTION

The invention is particularly applicable to high modulus, low elongation (a modulus of elongation of at least $7 \times 10^6$ psi and an elongation at break of at most 5 percent) fibers or filaments. Glass fibers are most often used in practicing the invention and such fibers tend to be sensitive to interfilament abrasion. Examples of such glass fibers are described at page 29 of *The Manufacturing Technology of Continuous Glass Fibers* by K. L. Loewenstein, published in 1973 and 1983 by Elsevier Scientific Publishing Company, Library of Congress Card Number: 72-97429.

The glass fibers are treated with a fiber protectant to reduce interfilament abrasion. This aqueous first chemical composition or sizing may include silane coupling agents, lubricants, antifoams, antistatic agents, emulsifiers, bactericides or any other ingredient(s) known in the art to be useful in sizing fibers, though preferably not starch, in addition to water. The sizing is present on the fibers in an amount between about 0.5 percent and 5 percent by weight after drying. A plurality of the sized fibers or filaments may, be gathered together into bundles and further treated with the impregnant composition of this invention.

When the fibers used to practice this invention are glass fibers, they may be of any type, such as E-glass, D-glass, S-glass and low boron and/or fluorine glass to which a sizing is applied as the fibers are formed. The sizing may be applied in many ways; such as with-a roller, by spraying, by a belt or other means. The glass fibers usually have between 0.5 and 5 weight percent of the sizing composition on their surface after drying. Drying may be done at room temperature or at elevated temperatures. The sized glass fibers are typically gathered together into bundles or strands comprised of many individual fibers and wound onto a spool for further processing.

The ingredients of the aqueous sizing may be any known to those skilled in the art and usually comprise silanes, lubricants, antifoams, antistatic agents, emulsifiers, bactericides or any other ingredient(s) known in the art to be useful in sizing fibers, in addition to water. Although starch is a common ingredient in sizing for textile applications, usually starch is not present in the sizing employed on fibers to be used in the practice of this invention.

Silanes useful in this invention include gamma-aminopropyl trimethoxy silane, gamma-methacryloxypropyltrimethoxy silane, and gamma-glycidoxypropyltrimethoxy silane. Lubricants include cationic lubricants such as the alkyl imidazoline derivative which is a reaction product of stearic acid and tetraethylene pentamine stearic acid as well as polyethyleneimine polyamide. The sizing may also include a film former such as liquid polyoxyalkylene polyols or polyalkylene polyols an example of which is polypropylene/polyethylene copolymer.

The acrylic latex component of the impregnant composition and coating of this invention is the curable acrylic latex emulsion of acrylic homopolymers and copolymers including copolymers with acrylamide and methylol acrylamide. The acrylic emulsion is preferably of the self-crosslinking type and preferably anionic or nonionic. The reactive acrylic monomers include acrylamide and methylol acrylamide which crosslink upon the addition of heat to yield the acrylic polymer and water. Another suitable acrylic latex is that including acrylonitrile butadiene copolymers like that available from Goodrich Chemical Co. under the trade designation of HYCAR G-17. A particularly suitable acrylic latex is characterized by the temperature at which the torsional modulus of an air dried film is 300 kg/cm$^2$, referred to as T300, and which is a relative measure of stiffness. A T300 of about 22° C. is considered soft while higher numbers indicate more stiff acrylics. The acrylics which may be used in the practice of this invention have a T300 which may range from about −50 to about +35. The use of a low T300 acrylic will result in a relatively less stiff product which may also be somewhat tacky. The addition of a polyurethane can reduce this tackiness, although it may also decrease the stiffness.

Examples of self-crosslinking acrylic emulsions are the family of Rhoplex® emulsions commercially available from the Rohm & Haas Company. A specific example is Rhoplex® TR-407 which is anionic and has a T300 of +30, is milky white in appearance, has 45.5 percent solids, a Brookfield LVF viscosity at 25° C. of 30 cps (No. 1 spindle, 60 RPM), a pH of 3.5, and a density of 8.9 lb/gal. Another example is Rhoplex® HA-8, which is nonionic, has a T300 of −14, is milky white in appearance, has 45.5 percent solids, a Brookfield LVF viscosity of 550 cps (No. 3 spindle, 60 RPM), a pH of 3.0, and a density of 8.7 lb/gal. Another suitable acrylic latex is Rhoplex® WL-81 acrylic latex. Rhoplex® WL-81 acrylic latex is a thermoplastic acrylic polymer with approximately 40 percent solids, a Brookfield viscosity of 40 to 500 cps at 25° C. (No. 2 spindle, 30 RPM), a T300 of 60° C., a specific gravity of 1.036 and a pH of 7.5. An additional example of an acrylic latex is the Rhoplex 693 emulsion, which is a self-crosslinking acrylic polymer having a milky white liquid appearance with an anionic emulsifying system, a solids content of 50 percent, a pH of 5.5, a density at 25 degrees Centigrade (C) of 8.8 lbs/gal, and a minimum film-forming temperature of 12 degrees C., and a T300 of 24 degrees C.

Yet another suitable acrylic latex is a self-crosslinking ethylene acrylic acid copolymer. The ethylene acrylic acid (EAA) copolymers which are useful in the instant invention are dispersions of a polymer having an acrylic acid comonomer with a molecular weight of about from 5,000 to 10,000. The polymer has a hardness (shore D) of from about 42 to 48, a vicat softening point of about 104 to 115, a melt index of from about 300 to 1300 g/10 min and a density of about 0.96 gm/cc at 25° C. Specific examples of EAA copolymer dispersions are Michem® Prime 4990 or Michem® Prime 4983HS available from Michelman Inc. of Cincinnati, Ohio. These aqueous EM copolymer dispersions are white in color and have a total solids content of approximately 20 to 38 percent, though other concentrations would be effective also. These dispersions have a Brookfield viscosity of about 100 to 600, a surface tension of about 44 to 49 dynes/cm and weigh about 8.22 lbs/gal. The dispersible polymer in the two Michem® Prime formulations are Primacor® 5990 and 5980, respectively. Another suitable acrylic is the Michem® 48040 latex.

EAA's hydrophobic character enhances water resistance in the "wet" applications such as filter felt for the paper industry and in brushes. EAA also has good adhesive characteristics which helps the impregnant adhere strongly to the surface of the fiber.

The second acrylic latex must logically be different from the first but may otherwise be any known in the art. Suitable second acrylic latexes include those mentioned above.

Though the acrylic latex emulsion may be self-crosslinking, if a faster crosslinking rate is desired or less then optimal conditions exist, a catalyst may be added to speed the reaction rate. An example of a catalyst which may be used is Witco XW aqueous epoxy dispersion which is available from Witco Chemical Corporation, while another example is Cymel melamine resins from American Cyanamide Company like hexamethoxymethylmelamine and partially nethylated melamine formaldehyde: glycoluril containing compound and like partially methylated melamine formaldehyde. These catalyst or crosslinkers can be used for crosslinking any of the crosslinkable polymers including the polyurethane. When performed with the polyurethane, the resulting crosslinking is preferably only to a minor degree to maintain the thermoplasticity of the polyurethane.

The aqueous impregnant composition may include a wax such as a microcrystalline wax. Suitable commercially available waxes are, for example, Michem® Lube 296 microcrystalline wax and Polymekon® SPP-W microcrystalline wax. These waxes are paraffinic hydrocarbon dispersions are available from Michelman Inc. of Cincinnati, Ohio and the Petrolite Corporation of Tulsa, Okla., respectively. Also, the microcrystalline wax may be oxidized.

The polyurethane latexes, which may be used in the instant invention, are elastomeric, thermoplastic, curable, and either water soluble, emulsifiable or dispersible with the use of a dispersing agent. Examples of polyurethane polymers which can be used in this invention include those that are internally emulsified, examples of which may be found in U.S. Pat. Nos. 4,143,091; 4,208,494 and 4,208,495. Other types of polyurethane polymers that can be used are those having ionic groups present on the polymer molecule such as those disclosed in U.S. Pat. No. 4,066,591.

Other types of polyurethane ionomers, e.g. polyurethane polymers, having ionic groups present on the polymer that can be used in the composition of the present invention include polyurethane ionomers such as anionomers and cationomers. Examples of the ionomers include anionomers that are: produced by reacting organic duisocyanates having molecular weights of from about 160 to about 300 with tri and/or tetra alkylene polyols such as ethylene glycol, and optionally other aliphatic glycols having molecular weights of from about 62 to about 200 in the presence of glycols containing carboxyl, carboxylate, sulfonic acid and/or sulfonate groups and having a molecular weight of less than around 500. These polyurethane polymers containing the ionic groups of hydrophilic polyether segments are self-emulsifiable and do not need emulsifiers or high shear forces to be emulsified or dispersed, since they are self-dispersing. Also, cationic polyurethanes that are formed by quaternizing polyaddition reactions can be used. The type and amount of the ionic groups present in the ionic polyurethanes are selected so that the polyurethane is not only self-dispersing but that the particle size of the polyurethane is less than around 5 microns. The properties of these polyurethane polymers can vary from hard film properties to flexible film properties.

Specific examples of commercially available polyurethanes which may be used include the Witcobond® series available from Witco Chemical Corporation such as WitcoBond® W-212 and W-234. The Witcobond® W-212 material has a milky white appearance with a 30 percent solids level and a density of 8.7 lbs/gal. The flash point is greater than 100° C., the particle charge is cationic and the particle size about 1 micron. The pH at 25° C. (77° F.) is 4.5, and the viscosity at 25° C. in Brookfield LVF (cps) is 50, and the surface tension is dynes/cm is 41. The Witcobond® W-234 polyurethane is hazy in appearance and aliphatic in chemical type. The solids is 30 percent, and the density is 8.8 lbs/gal. The flash point is similar to the W-212 material and the particle charge is anionic. The pH at 25° C. is 8.0 and the viscosity at 25° C. as measured by Brookfield LVF in cps is 100, and the surface tension in dynes/cm is 54. Other polyurethanes which may be used are the Rucothane® polyurethane latex thermoplastic urethane elastomers which are also aliphatic in chemical type and have a solids content of 55 to 65 weight percent. Their pH is generally around 10 with particle sizes ranging from about 0.8 to about 2.5 microns. A particularly suitable polyurethane latex is that designated Rucothane® 2011L polyurethane.

A dye may also be added to the impregnant composition to provide for a colored strand product. Users of the treated strand may find dyed strand useful for various applications where color coding is important.

The aqueous impregnant composition may be prepared by adding the components to the appropriate amount of water with any emulsifiers or other additives such as flame retardants or the dye or wax previously mentioned. Preferably, the total solids of the aqueous impregnant composition ranges from around 25 to 35 weight percent. Preferably, the amounts of the components of the impregnant composition are: for the polyurethane around 3.5 to around 30.4 weight percent; for the first acrylic latex, around 2.5 to around 22 weight percent; for the wax, around 0.5 to 4.3 weight percent; and for the second acrylic latex, around 1.2 to around 13.3 weight percent. These weight percentages are based on the aqueous impregnant composition. The bundle of fibers or strand is coated with the impregnant composition by dipping in a bath, or by any other method known in the art. The impregnated strand is at least partially dried in air at room temperature or alternatively in a furnace or oven to speed the curing process and evaporate the water. The strand may be "opened up" just before entering the secondary treating composition bath by passing it over a bar or other spreading device which acts to separate the individual fibers from one another. This spreading of the fibers from one another results in a more thorough impregnation of the strand with the composition.

The amount of the impregnant composition on the strand is defined as the dip pick-up or DPU. The DPU is calculated using the weight of the glass strand before and after the impregnant composition is applied. The DPU is defined as the coated strand weight minus the uncoated strand weight, then divided by the uncoated strand weight. Multiplying the resultant figure by 100 results in %$_0$DPU. The DPU of the impregnated bundles or strands of the instant invention is in a range of about 5 to about 20 percent for a single pass through the impregnant bath and drying step. The strands may ultimately have a greater amount of coating than 30 percent by passing them through the impregnating bath a number of times or by overcoating the coated bundle of fibers or strands with the acrylic latex. Also, the bundle of fibers or stands are preferably dried after application of the aqueous coating as is known in the art. A particularly suitable drier is that of U.S. Pat. No. 5,197,202 incorporated herein.

The following examples illustrates an embodiment of the invention.

EXAMPLE

A 100 gallon (378.5 liter) mixture of the impregnant composition was made using 316 pounds (143.3 kilograms) of Rhoplex® TR-407 acrylic emulsion, 57.5 pounds (26.1 kilograms) of Rucothane® 2011L polyurethane, 90 pounds (40.8 kilograms) of Michem® Prime 4983HS ethylene acrylic acid copolymer, 13.2 pounds (6 kilograms) of Michem® Lube 296 microcrystalline wax and 42 gallons (159 liters) of deionized water.

The Rhoplex® acrylic emulsion was added to an agitated main tank and then 20 gallons (75.7 liters) of water were added at the rate of 1 gallon (3.8 liters) per minute. The Rucothane® polyurethane was introduced to a separate tank to which was added 10 gallons (37.9 liters) of water at a rate of one gallon (3.8 liters) per minute. The Rucothane® polyurethane solution was stirred for 5 minutes and then added to the main tank with the Rhoplex® acrylic emulsion. The Michem® Prime 4983-HS ethylene acrylic acid copolymer was introduced to a separate tank to which was added 10 gallons (37.9 liters) of water at a rate of one gallon (3.8 liters) per minute. The Michem® Prime 4983-HS ethylene acrylic acid copolymer mixture was then added to the main tank. The Michem® Lube 296 microcrystalline wax was added directly to the main tank and 2 gallons (7.6 liters) of water were used to rinse out the container into the main tank. Agitation was continued automatically for one minute of each 10-minute period. The total solids for the impregnant composition was around 32 weight percent to give an amount of the components on a weight percent of the aqueous impregnant composition as follows: The TR-407 latex 16.6 weight percent, and the amounts of the polyurethane XW110 and second acrylic latex Michem® Prime 4983, both 7.8 weight percent.

The impregnant composition was coated onto a glass fiber strand which had as a sizing the dried residue of an aqueous composition comprised of about 80 to 90 percent polypropylene/polyethylene copolymer, 5 to 10 percent polyethyleneimine polyamide, and 5 to 10 percent of gamma-aminopropyltrimethoxy silane. The sizing was present on the fibers after drying in an amount of about 0.7 weight percent. The glass fiber strand was composed of 1000 individual fibers of glass, each of which was 13 microns in diameter.

The aqueous impregnant composition was applied by spreading apart the individual fibers of the strand just before entering the impregnant composition, dipping the fibers into the composition, and at least partially drying them in an oven at about 280° C. for a few minutes. The fibers with the impregnant composition thereon had excellent hydrolytic stability, good adhesion to several polymers and are flexible yet stiff enough to be used in the manufacture of brushes and filters. The DPU was 18 percent and the flex resistance as measured by the MIT flex folding test was 500 cycles.

Table I contains further examples of embodiments of this invention where the formulations were prepared and applied to a bundle or plurality of glass fibers or strands in a similar manner as described for Example 1.

The aqueous impregnant compositions of Examples 2–39 were separately applied to different pluralities of glass fibers to result in bundles of various construction depending on the number of fibers or strands in the bundle. For instance, the bundle can have 1000 filaments, 4,000 filaments, 16,000 filaments and more. The fibers can have the fiber diameter of around E through around T and preferably H through and including Q.

The coated glass fiber bundles having the coating resulting from removing water from the aqueous impregnant compositions of Example es 3 and 5 and 6 through 8 were tested in corrosion testing. The coated samples were soaked in one normal sodium hydroxide for over 60 hours to determine the effects of the basic solution on the coating. The coatings had good corrosion resistance losing little of the coating on a dip pickup basis, where the dip pickup was measured both before and after the corrosion testing.

The coated and impregnated bundles of Examples 4, 9, 10 and 11 were subjected to the sodium hydroxide and/or potassium hydroxide and hydrochloric acid soaking and they gave good results. For instance, the coated bundle of Examples 9, 10, 11 and 12 had, respectively, an original breaking strength ranging from 77.6 pounds to 80.8 pounds. After one week of soaking in potassium hydroxide, the tensile strengths and breaking strengths ranged from 21.8 to 40.8 pounds.

The coated and impregnated bundle of Example 13 had Q-filament diameter fibers and was prepared in 1, 2, 3 and 4 strand bundles comprising the coated bundle. The coated bundle had a tensile strength of around 290 pounds for the single strand construction, 521 pounds for the two-strand construction and for knot tensile strength, 41 pounds for the one-strand construction and 79 pounds for the two-strand construction. This is on a dip pickup of 10 weight percent of the coated bundle.

Bundles coated with the dried residue of the aqueous coating and impregnating compositions of Examples 14–16 were tested in a 1000 filament construction for the bundle for tensile strength after corrosion testing. The original tensile strength for Examples 14–16, respectively, were 57.8, 62.4 for dip pickups ranging from 18 through 25.5 for Example 16 and 22.7 for Example 15. The tensile strength after 30 minutes of soaking in sodium hydroxide and three hours in hydrochloric acid were respectively for examples 14–16, 61.4 and 44.1, 68.7 and 41.3, and 61.6 and 41.4.

For the bundle with the dried residue of the aqueous impregnant composition of Example 27, the Massachusetts Institute of Technology (MIT) testing gave for a 2000 filament construction of the bundle 500 cycles and 1000 cycles and the tensile strength was 62.5 pounds. The flexibility for the bundles of Examples 14 and 15 were tested on the MIT tester at a half-pound and resulted in 730 as an average value and for Example 15 resulted in 2377 as an average value. The bundles of the plurality of filaments treated with the dried residue of the coating and impregnant compositions that were mentioned in Table 1 generally had good flexibility and strength for reinforcing fiber optic cable.

TABLE 1

Aqueous Impregnant Composition

| Example | Percent Solids | Example 2 Solids Wt % | Example 2 Aqueous Wt % | Example 2 Grams | Example 3 Solids Wt % | Example 3 Aqueous Wt % | Example 3 Grams | Example 4 Solids Wt % | Example 4 Aqueous Wt % | Example 4 Grams | Example 5 Solids Wt % | Example 5 Aqueous Wt % | Example 5 Grams | Example 6 Solids Wt % | Example 6 Aqueous Wt % | Example 6 Grams |
|---|---|---|---|---|---|---|---|---|---|---|---|---|---|---|---|---|
| Witco 290-H polyurethane | 65 | 87 | 30.4 | 318 | — | — | — | — | — | — | — | — | — | — | — | — |
| Witco W-160 polyurethane | 50 | — | — | — | 91.2 | 27.4 | 2250 | 77.3 | 23.2 | 338 | — | 23.4 | 2250 | 87 | 26.1 | 338 |
| Rucothane ® 2011L polyurethane | 65 | — | — | — | — | — | — | — | — | — | — | — | — | — | — | — |
| Witco XW crosslinker | 35 | 9 | 1.3 | 26 | 5.3 | 2.9 | — | — | — | — | — | 1 | 100 | — | — | — |
| Mobay XW-110 polyurethane | 60 | — | — | — | — | — | — | — | 3.8 | 56 | — | 4.6 | 370 | — | — | — |
| Mobay XW-110-2 polyurethane | — | — | — | — | — | — | — | — | — | — | — | — | — | — | — | — |
| Rhoplex ® WL-81 acrylic latex | 50 | 7.1 | 2.5 | 34 | 5 | 2.7 | 10 | — | — | — | — | 0.5 | 50 | 2.9 | 0.8 | 10 |
| Rhoplex ® TR-407 acrylic latex | 50 | — | — | — | — | — | — | — | — | — | — | — | — | — | — | — |
| Rhoplex ® E-693 acrylic latex | 0 | — | — | — | — | — | — | — | — | — | — | — | — | — | — | — |
| Michem ® Prime 4983HS acrylic | 35 | — | — | — | — | — | — | — | — | — | — | — | — | — | — | — |
| Michem ® Prime 4990 acrylic | 35 | 6 | 2.5 | 16 | 6 | 3.2 | — | 8 | 2.4 | 50 | 4.4 | 0.4 | 50 | — | 1.3 | 15 |
| Polymekon ® wax | 40 | — | — | — | — | — | — | 1.8 | 0.5 | 10 | — | — | — | — | — | — |
| Hycor G-17 acrylic butadiene | 50 | — | — | — | — | — | — | — | — | — | 5.9 | — | — | — | — | — |
| Cymel (100%) | — | — | — | — | — | — | — | — | — | — | — | — | — | 2 | — | 8 |
| Plasticizer | — | — | — | — | — | — | — | — | — | — | — | — | — | — | — | — |
| Emulsifier | — | — | — | — | — | — | — | — | — | — | — | — | — | — | — | — |
| TOTAL | | | | | | | | | | | | | | | | |

| | Example 7 Solids Wt % | Example 7 Aqueous Wt % | Example 7 Grams | Example 8 Solids Wt % | Example 8 Aqueous Wt % | Example 8 Grams | Example 9 Solids Wt % | Example 9 Aqueous Wt % | Example 9 Grams | Example 10 Solids Wt % | Example 10 Aqueous Wt % | Example 10 Grams | Example 11 Solids Wt % | Example 11 Aqueous Wt % | Example 12 Solids Wt % | Example 12 Aqueous Wt % |
|---|---|---|---|---|---|---|---|---|---|---|---|---|---|---|---|---|
| Witco 290-H polyurethane | 90 | 27 | 338 | 63.5 | 19 | — | 15–24 | — | 154 kg | 51.3 | 15.6 | — | 48.5 | 14.8 | 45 | 13.8 |
| Witco W-160 polyurethane | — | — | — | — | — | 2250 | — | — | — | — | — | — | — | — | — | — |
| Rucothane ® 2011L polyurethane | — | — | — | — | — | — | 0.6–1 | 0.6–1 | 880 kg | 2.2 | 0.7 | — | 2.1 | 0.6 | 1.9 | 0.6 |
| Witco XW crosslinker | — | — | — | 12.5 | 3.8 | 370 | 3.9–6 | 3.9–6 | 884 kg | 14.8 | 4.5 | — | 13.6 | 4.2 | 12.9 | 4 |
| Mobay XW-110 polyurethane | 7.6 | 2.3 | 10 | 1.8 | 0.5 | 63 | — | — | — | — | — | — | — | — | — | — |
| Mobay XW-110-2 polyurethane | — | — | — | — | — | — | — | — | — | — | — | — | — | — | — | — |
| Rhoplex ® WL-81 acrylic latex | — | — | — | — | — | — | — | — | 100 | 18 | 5.5 | — | 22.5 | 6.8 | 58.8 | 18.1 |
| Rhoplex ® TR-407 acrylic latex | 5.3 | 1.6 | 7 | 2.2 | 0.7 | 100 | 3.7 | 3.7 | 752 kg | 3.6 | 1.1 | — | 3.3 | 1 | 3.1 | 1 |
| Rhoplex ® E-693 acrylic latex | — | — | — | — | — | — | — | — | — | — | — | — | — | — | — | — |
| Michem ® Prime 4983HS acrylic | — | — | — | — | — | — | 1.1–2 | 1.1–2 | — | — | — | — | — | — | — | — |
| Michem ® Prime 4990 acrylic | 5.3 | 1.6 | 7 | 2.9 | 0.9 | 53 | — | — | 760 | 9.0 | 2.7 | — | 8.5 | 2.6 | 7.9 | 2.4 |
| Polymekon ® wax | — | — | — | 16.9 | 5 | 300 | 2.7–2 | 2.7–2 | — | — | — | — | — | — | — | — |
| Hycor G-17 acrylic butadiene | — | — | — | — | — | — | 0.3 | 0.3 | 340 | 1.1 | 0.3 | — | 1 | 0.3 | 1 | 0.3 |
| Cymel (100%) | — | — | — | — | — | — | — | — | — | — | — | — | — | — | — | — |
| Plasticizer | — | — | — | — | — | — | — | — | — | — | — | — | — | — | — | — |
| Emulsifier | — | — | — | — | — | — | — | — | — | — | — | — | — | — | — | — |
| TOTAL | | | | | | | | | | | | | | | | |

TABLE 1-continued

Aqueous Impregnant Composition

| | Example 13 | | | Example 14 | | | Example 15 | | | Example 16 | | | Example 17 | | |
|---|---|---|---|---|---|---|---|---|---|---|---|---|---|---|---|
| | Solids Wt % | Aqueous Wt % | Grams | Solids Wt % | Aqueous Wt % | Grams | Solids Wt % | Aqueous Wt % | Grams | Solids Wt % | Aqueous Wt % | Grams | Solids Wt % | Aqueous Wt % | Grams |
| Witco 290-H polyurethane | 48.4 | 15 | 7093 | 28.9 | 8.7 | — | 53.6 | 16.1 | 214 | 78.3 | 23.4 | 570 | 37.6 | 9.6 | 129 |
| Witco W-160 polyurethane | — | — | — | — | — | 94 | — | — | — | — | — | — | — | — | — |
| Rucothane ® 2011L polyurethane | — | — | — | — | — | — | — | — | — | — | — | — | — | — | — |
| Witco XW crosslinker | 2.1 | 0.6 | 303 | — | — | — | — | — | — | — | — | — | — | — | — |
| Mobay XW-110 polyurethane | 14 | 4.3 | 2043 | — | — | — | — | — | — | — | — | — | — | — | — |
| Mobay XW-110-2 polyurethane | — | — | — | — | — | — | — | — | — | — | — | — | — | — | — |
| Rhoplex ® WL-81 acrylic latex | — | — | — | — | — | — | — | — | — | — | — | — | — | — | — |
| Rhoplex ® TR-407 acrylic latex | — | — | — | — | — | — | — | — | — | — | — | — | — | — | — |
| Rhoplex ® E-693 acrylic latex | — | — | — | — | — | — | — | — | — | — | — | — | — | — | — |
| Michem ® Prime 4983HS acrylic | 22.6 | 7 | 3310 | 9.5 | 2.8 | 44 | 17.5 | 5.2 | 50 | 8 | 2.4 | 83 | 4.9 | 1.2 | 24 |
| Michem ® Prime 4990 acrylic | 3.4 | 1 | 492 | — | — | — | — | — | — | — | — | — | 4.5 | 1.2 | 21 |
| Polymekon ® wax | — | — | — | — | 18.5 | 200 | — | 11.3 | 150 | 13.7 | 4.1 | 100 | 52.5 | 13.3 | 180 |
| Hycor G-17 acrylic butadiene | — | — | — | 61.6 Water | — | 148 | 37.5 Water | — | 135 | — | — | 160 | — | — | — |
| Cymel (100%) | 8.5 | 2.6 | 1248 | — | — | — | — | — | — | — | — | — | — | — | — |
| Plasticizer | 1 | 0.3 | 151 | — | — | — | — | — | — | — | — | — | — | — | — |
| Emulsifier | | | | | | | | | | | | | | | |
| TOTAL | SOLIDS - 27.2 | | | | | | | | | | | | SOLIDS - 25.4 | | |

| | Example 18 | | | Example 19 | | | Example 20 | | | Example 21 | | | Example 22 | | |
|---|---|---|---|---|---|---|---|---|---|---|---|---|---|---|---|
| | Solids Wt % | Aqueous Wt % | Grams | Solids Wt % | Aqueous Wt % | Grams | Solids Wt % | Aqueous Wt % | Grams | Solids Wt % | Aqueous Wt % | Grams | Solids Wt % | Aqueous Wt % | Grams |
| Witco 290-H polyurethane | 37.6 | 10.1 | — | 50 | 15.6 | 18.75 | 50 | 15.6 | 18.75 | 36.4 | 11.7 | 18.75 | 32.1 | 10.4 | 18.75 |
| Witco W-160 polyurethane | — | — | 180 | — | — | — | — | — | — | — | — | — | — | — | — |
| Rucothane ® 2011L polyurethane | — | — | — | — | — | — | — | — | — | — | — | — | — | — | — |
| Witco XW crosslinker | — | — | — | 2.1 | 0.6 | 0.8 | 1.8 | 0.5 | 0.8 | 1.6 | 0.5 | 0.8 | 1.4 | 0.4 | 0.8 |
| Mobay XW-110 polyurethane | — | — | — | 14.1 | 4.5 | 5.4 | 12.1 | 3.9 | 5.4 | 10.5 | 3.3 | 5.4 | 9.2 | 3 | 5.4 |
| Mobay XW-110-2 polyurethane | — | — | — | — | — | — | — | — | — | — | — | — | — | — | — |
| Rhoplex ® WL-81 acrylic latex | — | — | — | — | — | — | — | — | — | — | — | — | — | — | — |
| Rhoplex ® TR-407 acrylic latex | — | — | — | — | — | — | — | — | — | — | — | — | — | — | — |
| Rhoplex ® E-693 acrylic latex | — | — | — | — | — | — | — | — | — | — | — | — | — | — | — |
| Michem ® Prime 4983HS acrylic | 4.9 | 2.3 | — | 18.1 | 5.8 | 7.0 | 31.5 | 10 | 14.0 | 40.8 | 13.1 | 21 | 47.9 | 15.6 | 28 |
| Michem ® Prime 4990 acrylic | 4.9 | 2.3 | 24 | 3.5 | 1.1 | 1.3 | 2.9 | 0.9 | 1.3 | 2.5 | 0.8 | 1.3 | 2.2 | 0.7 | — |
| Polymekon ® wax | 52.5 | 14.3 | 21 | — | — | — | — | — | — | — | — | — | — | — | — |
| Hycor G-17 acrylic butadiene | — | — | 21 | — | — | — | — | — | — | — | — | — | — | — | — |
| Cymel (100%) | — | — | — | 10.1 | 3.2 | 3.8 | 8.5 | 2.7 | 3.8 | 7.4 | 2.4 | 3.8 | 6.5 | 2.1 | 3.8 |
| Plasticizer | | | | 1.1 | 0.3 | 0.4 | 0.9 | 0.3 | 0.4 | 0.8 | 0.2 | 0.4 | 0.8 | 0.2 | 0.4 |
| Emulsifier | | | | | | | | | | | | | | | |
| TOTAL | SOLIDS - 27.2 | | | | | | | | | | | | | | |

TABLE 1-continued

Aqueous Impregnant Composition

| | Example 23 | | | Example 24 | | | Example 25 | | | Example 26 | | | Example 27 | | | Example 28 | | |
|---|---|---|---|---|---|---|---|---|---|---|---|---|---|---|---|---|---|---|
| | Solids Wt % | Aqueous Wt % | Grams | Solids Wt % | Aqueous Wt % | Gram Dry | Solids Wt % | Aqueous Wt % | Gram Dry | Solids Wt % | Aqueous Wt % | Gram Dry | Solids Wt % | Aqueous Wt % | Gram Dry | Solids Wt % | Aqueous Wt % | Gram Dry |
| Witco 290-H polyurethane | 2.86 | 9.4 | 18.75 | 21.4 | 55.1 | — | — | — | — | — | — | — | — | — | — | — | — | — |
| Witco W-160 polyurethane | — | — | — | — | — | — | — | — | — | — | — | — | — | — | — | — | — | — |
| Rucothane ® 2011L polyurethane | 1.2 | 0.4 | — | — | — | — | — | — | — | — | 19.8 | 810 | — | — | — | — | — | — |
| Witco XW crosslinker | 8.2 | 2.7 | 0.8 | 2.3 | 0.5 | — | — | — | — | 65.3 | 0.8 | 34 | 15 | 3.8 | 2840 | — | — | — |
| Mobay XW-110 polyurethane | — | — | 5.4 | 16 | 3.2 | 1287 | 22.5 | 6.8 | — | 2.7 | 5.7 | 234 | — | — | — | 22 | 6.7 | 1287 |
| Mobay XW-110-2 polyurethane | — | 4.3 | — | — | — | — | — | — | — | 18.9 | — | — | — | — | — | — | — | — |
| Rhoplex ® WL-81 acrylic latex | — | — | — | — | — | — | — | — | — | — | — | — | — | — | — | — | — | — |
| Rhoplex ® TR-407 acrylic latex | — | — | — | — | — | 450 | 7.9 | 2.4 | — | — | — | — | 70 | 18.2 | 13388 | — | — | — |
| Rhoplex ® E-693 acrylic latex | — | 12.8 | — | — | — | 3976 | 70 | 21 | — | — | — | — | — | — | — | 8.9 | 2.6 | 500 |
| Michem ® Prime 4983HS acrylic | 53.5 | 17.5 | 35 | 22.9 | 4.5 | — | — | — | — | 8.5 | 2.6 | 105 | 15 | 3.9 | 2860 | 66 | 19.8 | 3976 |
| Michem ® Prime 4990 acrylic | — | 14.9 | — | — | — | — | — | — | — | — | — | — | — | — | — | — | — | — |
| Polymekon ® wax | 2 | 0.7 | 1.3 | 3.9 | 0.8 | — | — | — | — | 4.5 | 1.3 | 56 | — | — | — | — | — | — |
| Hycor G-17 acrylic butadiene | — | — | — | — | — | — | — | — | — | — | — | — | — | — | — | — | — | — |
| Cymel (100%) | 5.8 | 0.2 | 3.8 | — | — | — | — | — | — | — | — | — | — | — | — | — | — | — |
| Plasticizer | 0.6 | — | 0.4 | — | — | — | 1.2 | — | — | — | — | — | — | — | — | — | — | — |
| Emulsifier | — | — | — | — | — | — | — | — | — | — | — | — | — | — | — | — | — | — |
| TOTAL | | | | | | | | | | | | | | | | | | |

| | Example 29 | | | Example 30 | | | Example 31 | | | Example 32 | | | Example 33 | | |
|---|---|---|---|---|---|---|---|---|---|---|---|---|---|---|---|---|
| | Solids Wt % | Aqueous Wt % | Gram Dry | Solids Wt % | Aqueous Wt % | Gram Dry | Solids Wt % | Aqueous Wt % | Gram Dry | Solids Wt % | Aqueous Wt % | Gram Dry | Solids Wt % | Aqueous Wt % | Grams |
| Witco 290-H polyurethane | — | — | — | 87.3 | 26.2 | 1034 | — | — | — | — | — | — | — | — | — |
| Witco W-160 polyurethane | — | — | — | — | — | — | — | — | — | — | — | — | — | — | — |
| Rucothane ® 2011L polyurethane | — | — | — | — | — | — | 13.8 | 3.5 | 2840 | 17.6 | 4.6 | 3393 | — | — | — |
| Witco XW crosslinker | — | — | — | — | — | — | — | — | — | — | — | — | 47 | 7.3 | 94 |
| Mobay XW-110 polyurethane | 14 | 4.3 | 108 | — | — | — | — | — | — | — | — | — | — | — | — |
| Mobay XW-110-2 polyurethane | — | — | — | — | — | — | — | — | — | — | — | — | — | — | — |
| Rhoplex ® WL-81 acrylic latex | — | — | — | — | — | — | 72 | 18 | 14820 | 66.5 | 17.3 | 12910.5 | — | — | — |
| Rhoplex ® TR-407 acrylic latex | 40 | 12.8 | 323 | — | — | — | — | — | — | — | — | — | — | — | — |
| Rhoplex ® E-693 acrylic latex | 46 | 14.9 | 366 | — | — | — | — | — | — | — | — | — | — | — | — |
| Michem ® Prime 4983HS acrylic | — | — | — | 8.6 | 2.6 | 102 | 13.9 | 3.5 | 2859 | 14.3 | 3.7 | 2777.8 | 5.1 | 1.3 | 24 |
| Michem ® Prime 4990 acrylic | — | — | — | 4 | 1.2 | 48 | — | — | — | 1.6 | 0.4 | 300 | 5.1 | 1.3 | 21 |
| Polymekon ® wax | — | — | — | — | — | — | — | — | — | — | — | — | 61.1 | 15.5 | 200 |
| Hycor G-17 acrylic butadiene | — | — | — | — | — | — | — | — | — | — | — | — | — | — | — |
| Cymel (100%) | — | — | — | — | — | — | — | — | — | — | — | — | — | — | — |

TABLE 1-continued

Aqueous Impregnant Composition

| | Example 34 | | | Example 35 | | | Example 36 | | | Example 37 | | | Example 38 | | | Example 39 | | |
|---|---|---|---|---|---|---|---|---|---|---|---|---|---|---|---|---|---|---|
| | Gram Dry | Solids Wt % | Aqueous Wt % | Gram Dry | Solids Wt % | Aqueous Wt % | Gram Dry | Solids Wt % | Aqueous Wt % | Gram Dry | Solids Wt % | Aqueous Wt % | Gram Dry | Solids Wt % | Aqueous Wt % | Gram Dry | Solids Wt % | Aqueous Wt % |
| Witco 290-H polyurethane | — | — | — | — | — | — | — | — | — | 683 | 4.6 | 1.4 | 538 | 4.1 | 1.3 | 1509 | 75 | 23 |
| Witco W-160 polyurethane | — | — | — | — | — | — | — | — | — | — | — | — | — | — | — | — | — | — |
| Rucothane ® 2011L polyurethane | — | — | — | — | — | — | — | — | — | — | — | — | — | — | — | — | — | — |
| Witco XW crosslinker | — | — | — | — | — | — | — | — | — | — | — | — | — | — | — | — | — | — |
| Mobay XW-110 polyurethane | — | — | — | — | — | — | — | — | — | — | — | — | — | — | — | — | — | — |
| Mobay XW-110-2 polyurethane | 93.7 | 13.4 | 4.3 | 108.8 | 15.9 | 5.2 | 118 | 16.7 | 5.4 | — | — | — | — | — | — | 300 | 7.6 | 2.4 |
| Rhoplex ® WL-81 acrylic latex | — | — | — | — | — | — | — | — | — | — | — | — | — | — | — | — | — | — |
| Rhoplex ® TR-407 acrylic latex | — | — | — | — | — | — | — | — | — | — | — | — | — | — | — | — | — | — |
| Rhoplex ® E-693 acrylic latex | 292 | 41.7 | 13.3 | 326.3 | 47.7 | 15.4 | 354 | 50.2 | 16.3 | 10500 | 71 | 22 | 8345 | 64 | 2.4 | 192 | 13.9 | 4.3 |
| Michem ® Prime 4983HS acrylic | 314 | 44.8 | 14.3 | 249.2 | 36.4 | 11.8 | 234 | 33.2 | 10.8 | 3535 | 24 | 7.4 | 3139 | 31.8 | 9.9 | — | — | — |
| Michem ® Prime 4990 acrylic | — | — | — | — | — | — | — | — | — | — | — | — | — | — | — | — | — | — |
| Polymekon ® wax | — | — | — | — | — | — | — | — | — | — | — | — | — | — | — | 120 | 3.5 | 4.3 |
| Hycor G-17 acrylic butadiene | — | — | — | — | — | — | — | — | — | — | — | — | — | — | — | — | — | — |
| Cymel (100%) | — | — | — | — | — | — | — | — | — | — | — | — | — | — | — | — | — | — |
| Plasticizer | — | — | — | — | — | — | — | — | — | — | — | — | — | — | — | — | — | — |
| Emulsifier | — | — | — | — | — | — | — | — | — | — | — | — | — | — | — | — | — | — |
| TOTAL | — | — | — | — | — | — | — | — | — | — | — | — | — | — | — | — | — | — |

I claim:

1. A flexible bundle of high modulus, low elongation fibers wherein the fibers have thereon a moisture reduced residue of an aqueous chemical sizing composition, said bundle of fibers having been impregnated with an at least partially cured residue resulting from at least partially drying an aqueous impregnating coating composition which comprises:

a water soluble, emulsifiable or dispersible curable acrylic polymer or copolymer latex;

a second water soluble, emulsifiable or dispersible curable acrylic polymer or copolymer latex and/or wax;

water in an amount to provide said composition with between 1 and 60 percent solids before drying.

2. A flexible bundle of high modulus, low elongation fibers, wherein the fibers have thereon a moisture reduced residue of an aqueous chemical sizing composition, said bundle of fibers having been impregnated with a residue resulting from driving an aqueous impregnating coating composition which comprises:

an acrylic selected from water soluble self-crosslinkable acrylics, water emulsifiable self-crosslinkable acrylics and water dispersible self-crosslinkable acrylics;

a copolymer selected from water soluble crosslinkable ethylene acrylic acid copolymers, water emulsifiable crosslinkable ethylene acrylic acid copolymers and water dispersible crosslinkable ethylene acrylic acid copolymers; and water in an amount to provide said composition with between 10 and 50 percent solids before drying.

3. The bundle of fibers of claim 2, in which said aqueous impregnating coating composition further comprises an oxidized microcrystalline wax.

4. The bundle of fiber of claim 2, wherein said fibers are glass fibers.

5. The bundle of fibers of claim 2, wherein said fibers are dried at an elevated temperature for a time sufficient to at least partially cure said impregnant coating on said fibers.

6. The bundle of fibers of claim 2 in which said aqueous impregnating coating composition further comprises a water soluble dye.

7. A flexible bundle of high modulus, low elongation fibers, wherein the fibers have a moisture reduced residue of an aqueous chemical sizing composition, said bundle of fibers having been impregnated with a residue resulting from drying an aqueous impregnating coating composition which comprises:

an acrylic, in an amount of between 30 and 90 percent on a nonaqueous basis by weight, selected from water soluble self-crosslinkable acrylics, water emulsifiable self-crosslinkable acrylics and water dispersible self-crosslinkable acrylics;

a copolymer, in an amount of between 5 and 30 percent on a nonaqueous basis by weight, selected from water soluble crosslinkable ethylene acrylic acid copolymers, water emulsifiable crosslinkable ethylene acrylic acid copolymers and water dispersible crosslinkable ethylene acrylic acid copolymers; and water in an amount to provide said composition with between 10 and 50 percent solids before drying.

8. The bundle of fibers of claim 3 wherein said microcrystalline wax is in an amount of between 1 and 10 weight percent of said aqueous impregnating coating composition on a nonaqueous basis by weight.

9. The bundle of fibers of claim 4 wherein said aqueous impregnating coating composition is present on said glass fibers in an amount by weight of between 5 and 20 percent.

10. The bundle of fibers of claim 7 in which said aqueous impregnating coating composition further comprises an oxidized microcrystalline wax.

11. The bundle of fibers of claim 10 wherein said microcrystalline wax is in an amount of between 1 and 10 weight percent of said aqueous impregnating coating composition on a nonaqueous basis by weight.

12. The bundle of fibers of claim 7 wherein said fibers are glass fibers.

13. The bundle of fibers of claim 12 wherein said aqueous impregnating coating composition is present on said glass fibers in an amount by weight of between about 5 and 20 percent.

14. The bundle of fibers of claim 7 wherein said fibers are dried at an elevated temperature for a time sufficient to cure said impregnant coating on said fiber.

15. The bundle of fibers of claim 7 in which said aqueous impregnating coating composition further comprises a water soluble dye.

16. A flexible bundle of high modulus, low elongation fibers, wherein the fibers have thereon a moisture reduced residue of an aqueous chemical sizing composition, said bundle of fibers having been impregnated with an at least partially cured residue resulting from at least partially drying an aqueous impregnating coating composition which comprises:

an acrylic selected from water soluble self-crosslinkable acrylics, water emulsifiable self-crosslinkable acrylics and water dispersible self-crosslinkable acrylics;

a copolymer selected from water soluble crosslinkable ethylene acrylic acid copolymers, water emulsifiable crosslinkable ethylene acrylic acid copolymers and water dispersible crosslinkable ethylene acrylic acid copolymers; and water in an amount to provide said composition with between 10 and 50 percent solids before drying.

17. The bundle of fibers of claim 16, in which said aqueous impregnating coating composition further comprises an oxidized microcrystalline wax.

18. The bundle of fibers of claim 17 wherein said microcrystalline wax is in an amount of between 1 and 10 weight percent of said aqueous impregnating coating composition on a nonaqueous basis by weight.

19. The bundle of fibers of claim 16, wherein said fibers are glass fibers.

20. The bundle of fibers of claim 19 wherein said aqueous impregnating coating composition is present on said glass fibers in an amount by weight of between 5 and 20 percent.

21. The bundle of fibers of claim 16, wherein said fibers are dried at an elevated temperature for a time sufficient to at least partially cure said impregnant coating on said fibers.

22. The bundle of fibers of claim 16, in which said aqueous impregnating coating composition further comprises a water soluble dye.

23. A flexible bundle of high modulus, low elongation fibers, wherein the fibers have a moisture reduced residue of an aqueous chemical sizing composition, said bundle of fibers having been impregnated with an at least partially cured residue resulting from at least partially drying an aqueous impregnating coating composition which comprises:

an acrylic, in an amount of between 30 and 90 percent on a nonaqueous basis by weight, selected from water soluble self-crosslinkable acrylics, water emulsifiable self-crosslinkable acrylics and water dispersible self-crosslinkable acrylics;

a copolymer, in an amount of between 5 and 30 percent on a nonaqueous basis by weight, selected from water soluble crosslinkable ethylene acrylic acid copolymers, water emulsifiable crosslinkable ethylene acrylic acid copolymers and water dispersible crosslinkable ethylene acrylic acid copolymers; and water in an amount to provide said composition with between 10 and 50 percent solids before drying.

24. The bundle of fibers of claim 23, in which said aqueous impregnating coating composition further comprises an oxidized microcrystalline wax.

25. The bundle of fibers of claim 24 wherein said microcrystalline wax is in an amount of between 1 and 10 weight percent of said aqueous impregnating coating composition on a nonaqueous basis by weight.

26. The bundle of fibers of claim 23 wherein said fibers are glass fibers.

27. The bundle of fibers of claim 26 wherein said aqueous impregnating coating composition is present on said glass fibers in an amount by weight of between 5 and 20 percent.

28. The bundle of fibers of claim 23 wherein said fibers are dried at an elevated temperature for a time sufficient to at least partially cure said impregnant coating on said fiber.

29. The bundle of fibers of claim 23 in which said aqueous impregnating coating composition further comprises a water soluble dye.

* * * * *